US011265134B2

(12) United States Patent
Gulati et al.

(10) Patent No.: US 11,265,134 B2
(45) Date of Patent: Mar. 1, 2022

(54) FEEDBACK TRANSMISSION USING MULTIPLE ACCESS SIGNATURES

(71) Applicant: QUALCOMM Incorporated, San Diego, CA (US)

(72) Inventors: Kapil Gulati, Hillsborough, NJ (US); Arjun Bharadwaj, Cupertino, CA (US); Naga Bhushan, San Diego, CA (US); Tien Viet Nguyen, Bridgewater, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 16/737,644

(22) Filed: Jan. 8, 2020

(65) Prior Publication Data

US 2020/0228291 A1 Jul. 16, 2020

Related U.S. Application Data

(60) Provisional application No. 62/790,805, filed on Jan. 10, 2019.

(51) Int. Cl.
*H04W 4/00* (2018.01)
*H04L 5/00* (2006.01)
*H04W 72/04* (2009.01)

(52) U.S. Cl.
CPC ....... *H04L 5/0055* (2013.01); *H04W 72/0446* (2013.01)

(58) Field of Classification Search
CPC ... H04L 5/0055; H04L 5/0051; H04L 5/0007; H04L 1/1861; H04L 1/1854; H04W 72/0446

USPC .......................................................... 370/329
See application file for complete search history.

(56) References Cited

U.S. PATENT DOCUMENTS

| | | | | |
|---|---|---|---|---|
| 2011/0116455 A1* | 5/2011 | Damnjanovic | ....... | H04L 1/0028 370/329 |
| 2018/0368169 A1* | 12/2018 | Jung | .................. | H04W 72/0413 |
| 2019/0052436 A1* | 2/2019 | Desai | ........................ | H04L 1/18 |
| 2019/0132870 A1* | 5/2019 | Guey | .................. | H04W 74/085 |
| 2019/0288794 A1* | 9/2019 | Yamada | .................. | H04W 72/02 |
| 2020/0112400 A1* | 4/2020 | Lee | ........................ | H04W 76/11 |
| 2020/0236670 A1* | 7/2020 | Xiong | .................... | H04L 1/1812 |

(Continued)

FOREIGN PATENT DOCUMENTS

WO 2018128200 A1 7/2018

OTHER PUBLICATIONS

International Search Report and Written Opinion—PCT/US2020/012890—ISA/EPO—dated Apr. 2, 2020.

(Continued)

*Primary Examiner* — Mang Hang Yeung
(74) *Attorney, Agent, or Firm* — Harrity & Harrity, LLP (57) ABSTRACT

Various aspects of the present disclosure generally relate to wireless communication. In some aspects, a user equipment (UE) may receive, from another UE, a particular transmission on a particular transmission resource. The UE may transmit, on a feedback resource selected based at least in part on the particular transmission resource, a feedback message using a multiple access signature determined based at least in part on a characteristic of the particular transmission. Numerous other aspects are provided.

30 Claims, 5 Drawing Sheets

(56) References Cited

U.S. PATENT DOCUMENTS

2021/0219268 A1* 7/2021 Li .......................... H04W 80/02
2021/0306824 A1* 9/2021 Li ..................... H04W 72/1263

OTHER PUBLICATIONS

Samsung: "Discussion on NoMA Related Procedure", 3GPP Draft, 3GPP TSG RAN WG1 Meeting #94, R1-1808762, 3rd Generation Partnership Project (3GPP), Mobile Competence Centre, 650, Route Des Lucioles, F-06921 Sophia-Antipolis Cedex, France, vol. RAN WG1. No. Gothenburg, Sweden, Aug. 20, 2018-Aug. 24, 2018, Aug. 11, 2018 (Aug. 11, 2018), XP051516135, 9 Pages, Retrieved from the Internet: URL: http://www.3gpp.org/ftp/tsg%5Fran/WG1%6FRL1/TSGR1%5F94/Docs/R1%2D1808762%2Ezip [retrieved on Aug. 11, 2018], p. 6.

* cited by examiner

FEEDBACK TRANSMISSION USING MULTIPLE ACCESS SIGNATURES

CROSS-REFERENCE TO RELATED APPLICATION

This application claims priority to U.S. Provisional Patent Application No. 62/790,805, filed on Jan. 10, 2019, entitled "FEEDBACK TRANSMISSION USING MULTIPLE ACCESS SIGNATURES," which is hereby expressly incorporated by reference herein.

FIELD OF THE DISCLOSURE

Aspects of the present disclosure generally relate to wireless communication, and techniques and apparatuses for feedback transmission using multiple access signatures.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, from another UE, a particular transmission on a particular transmission resource. The method may include transmitting, on a feedback resource selected based at least in part on the particular transmission resource, a feedback message using a multiple access signature determined based at least in part on a characteristic of the particular transmission.

In some aspects, a UE for wireless communication may include memory and one or more processors operatively coupled to the memory. The memory and the one or more processors may be configured to receive, from another UE, a particular transmission on a particular transmission resource. The memory and the one or more processors may be configured to transmit, on a feedback resource selected based at least in part on the particular transmission resource, a feedback message using a multiple access signature determined based at least in part on a characteristic of the particular transmission.

In some aspects, a non-transitory computer-readable medium may store one or more instructions for wireless communication. The one or more instructions, when executed by one or more processors of a UE, may cause the one or more processors to receive, from another UE, a particular transmission on a particular transmission resource. The one or more instructions, when executed by the one or more processors of the UE, may cause the one or more processors to transmit, on a feedback resource selected based at least in part on the particular transmission resource, a feedback message using a multiple access signature determined based at least in part on a characteristic of the particular transmission.

In some aspects, an apparatus for wireless communication may include means for receiving, from another apparatus, a particular transmission on a particular transmission resource. The apparatus may include means for transmitting, on a feedback resource selected based at least in part on the particular transmission resource, a feedback message using a multiple access signature determined based at least in part on a characteristic of the particular transmission.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
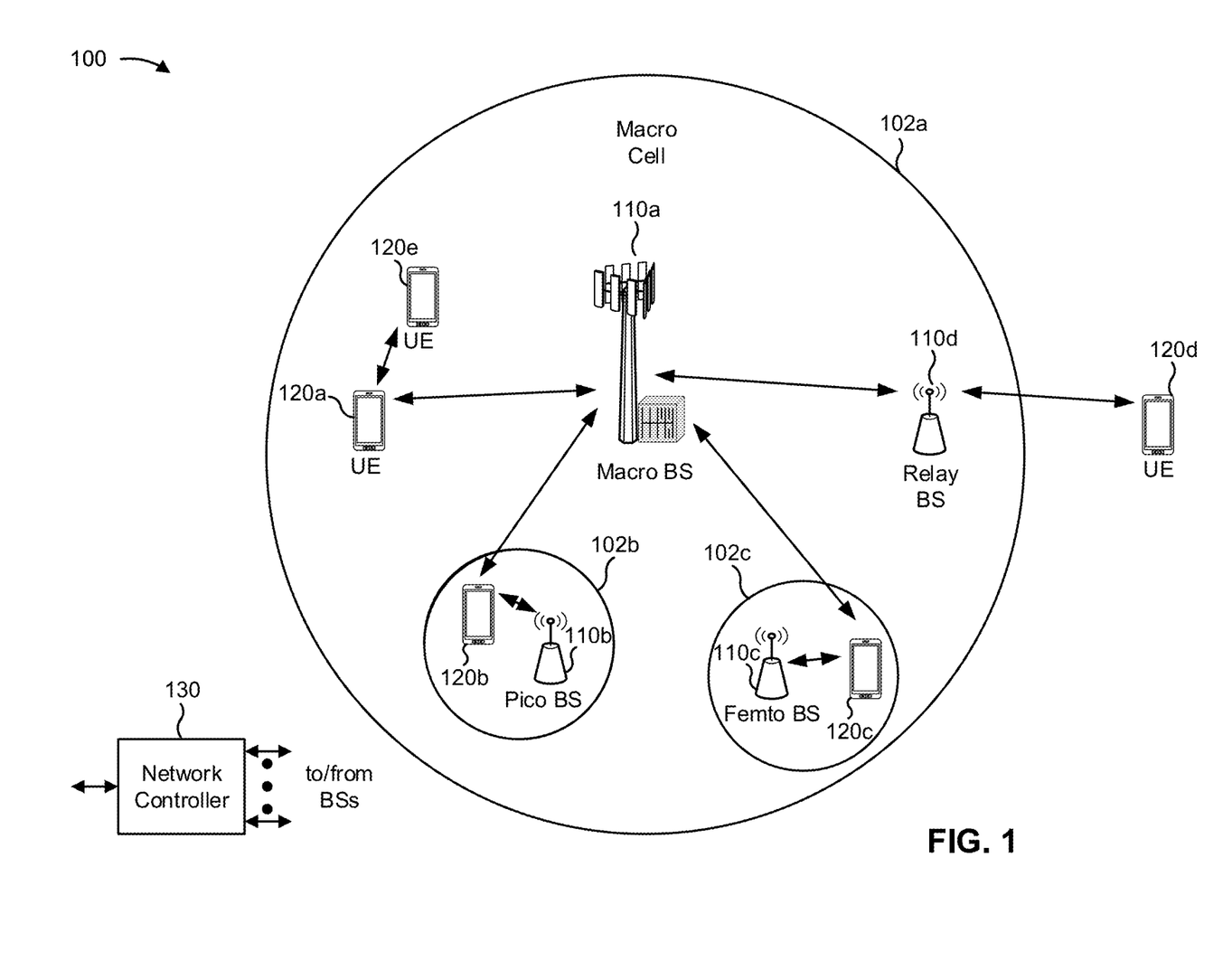
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. Wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110. For example, the UE 120 may transmit control-data transmissions during control-data resources, and may transmit feedback messages as responses to control-data transmissions during feedback resources. In this case, the feedback resources may be periodic system-wide feedback resources with a many-to-one mapping to the control-data resources as described in more detail herein. For example, the feedback resources may be pre-determined or pre-configured, such that UEs in a network may determine and/or may have stored information identifying the feedback resources, which are to be shared among a plurality of UEs.

As indicated above, FIG. 1 is provided merely as an example. Other examples may differ from what is described with regard to FIG. 1.

Figure 2:
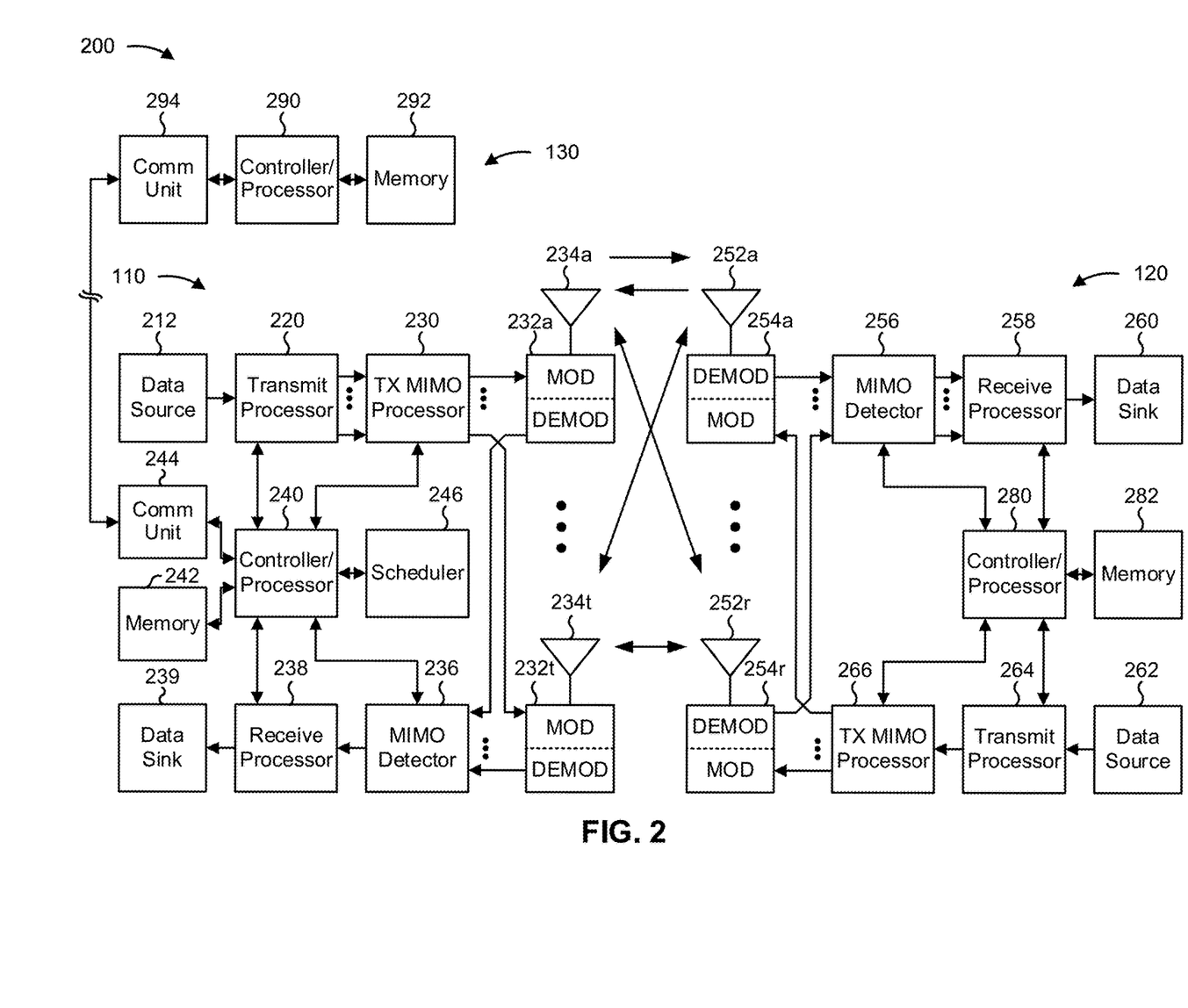
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with feedback transmission using multiple access signatures, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving, from another UE, a particular transmission on a particular transmission resource, means for transmitting, on a feedback resource selected based at least in part on the particular transmission resource, a feedback message using a multiple access signature determined based at least in part on a characteristic of the particular transmission, and/or the like. In some aspects, such means may include one or more components of UE 120 described in connection with FIG. 2.

As indicated above, FIG. 2 is provided merely as an example. Other examples may differ from what is described with regard to FIG. 2.

In some communications systems, such as 5G, UEs may communicate with other UEs using sidelink communications. For example, in vehicle-to-everything (V2X) communications, a first UE may transmit to a second UE, and the second UE may transmit to the first UE using a distributed channel access mechanism. In a distributed channel access mechanism, the UEs may select time resources, frequency resources, and/or the like for communication based at least in part on a decentralized medium access control (MAC) protocol and without a central scheduling unit providing scheduling information. When a first UE transmits to a second UE, the second UE may transmit feedback information, such as a hybrid automatic repeat request (HARQ) acknowledgement message (ACK), a HARQ negative acknowledgement message (NACK), a channel quality indicator (CQI) message, a rank indicator (RI) message, a precoding matrix indicator (PMI) message, and/or the like, as a response to the first UE transmitting to the second UE.

To accommodate response messages (e.g., HARQ ACK, HARQ NACK, CQI, and/or the like), feedback resources may be determined. For example, in one network scenario, a potential feedback resource may be present in each slot. When the potential feedback resource is not needed for a feedback transmission, the potential feedback resource may be opportunistically used by a UE for a control transmission, a data transmission, and/or the like. For example, a first UE may determine that no second UEs are to transmit feedback transmissions during a particular feedback resource of a slot (e.g., based at least in part on no non-feedback transmissions being transmitted prior to the particular feedback resource for which a feedback transmission is to be transmitted), and may determine to use the particular feedback resource for a non-feedback transmission. In this way, the UEs may enable network flexibility and may improve network latency relative to reserving the feedback resources for only feedback transmissions.

However, opportunistic use of feedback resources may result in relatively high signaling overhead. For example, switching between transmit modes and receive modes frequently for opportunistic use of feedback resources in each slot may result in relatively high receiver tuning gaps and issues with signal to interference noise ratio (SINR) variations, which may reduce available resources. Some aspects described herein enable UEs to use system-wide feedback resources that occur periodically with a many-to-one mapping of control-data resources to feedback resources based at least in part on a periodicity of the system-wide feedback resources. For example, a UE may use a multiple access scheme to enable the many-to-one mapping on a feedback resource. In this way, the UE improves utilization of the feedback resource relative to sub-splitting feedback resources and using orthogonal feedback transmission with a low quality of service (QoS) to achieve one-to-one mapping between control-data resources and feedback resources.

Figure 3:
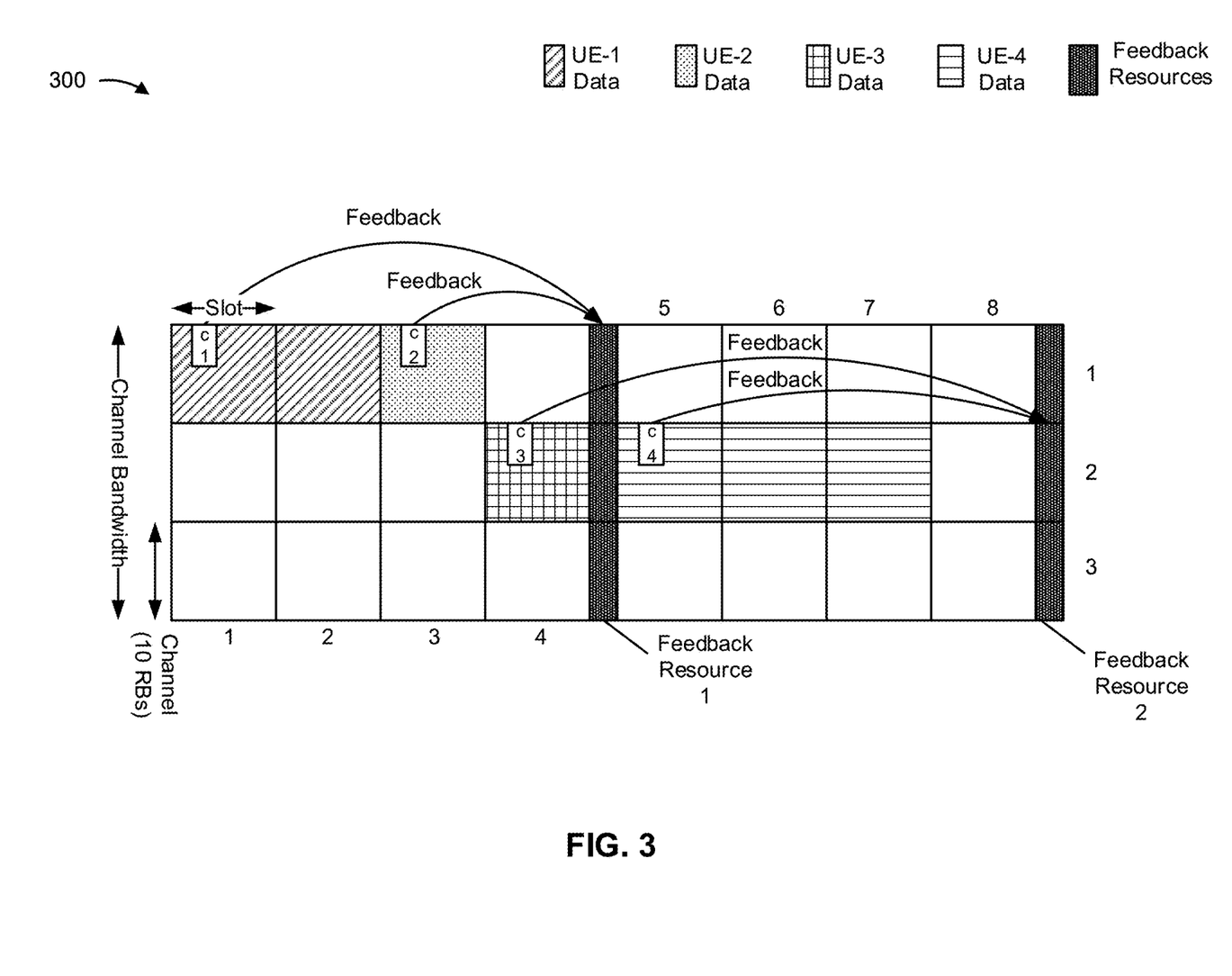
FIG. 3 is a diagram illustrating an example of system-wide feedback resources, in accordance with various aspects of the present disclosure.

FIG. 3 is a diagram illustrating an example 300 of system-wide feedback resources, in accordance with various aspects of the present disclosure.

As shown in FIG. 3, a decentralized MAC scheme may include a channel bandwidth assigned for sidelink communications between UEs. The channel bandwidth may be divided into a set of channels (e.g., channels 1 through 3) that each include 10 resource blocks (RBs). Time resources may be assigned to a set of slots (e.g., slots 1 through 8) with periodic system-wide feedback resources (e.g., feedback resources 1 and 2) occurring periodically in between sets of slots.

With many-to-one mapping enabled, as an example, a first set of slots (e.g., slots 1 and 2 of channel 1) may be used by a first UE for a data transmission (e.g., UE-1 Data) and/or a control transmission (e.g., c1). In this case, control transmission c1 may trigger a first feedback transmission by another UE using feedback resource 1 of channel 1. Further, in slot 3 a second UE may transmit data (e.g., UE-2 Data) and/or a control transmission (e.g., c2), which may trigger a second feedback transmission by another UE using feedback resource 1 of channel 1. In this case, the first feedback transmission and the second feedback transmission may be associated with different multiple access signatures, as described in more detail herein.

Similarly, in channel 2, a third UE and a fourth UE may transmit data (e.g., UE-3 Data in slot 4 and UE-4 Data in slots 5-7, respectively) and/or control information (e.g., c3 and c4, respectively), which may trigger feedback transmissions by other UEs using feedback resource 2 of channel 2. By using multiple access-signatures for many-to-one mapping of control-data resources (e.g., slot 1 and slot 3 of channel 1) to feedback resources (e.g., feedback resource 1 in channel 1), UEs enable use of periodic system-wide feedback resources without sub-splitting feedback resources for one-to-one mapping. Alternatively, by using multiple access-signatures, an amount of sub-splitting may be reduced. For example, feedback resources may be sub-split to map to a subset of control-data resources, and multiple access signatures may enable distinguishing between the subset of control-data resources.

As indicated above, FIG. 3 is provided as an example. Other examples may differ from what is described with respect to FIG. 3.

Figure 4:
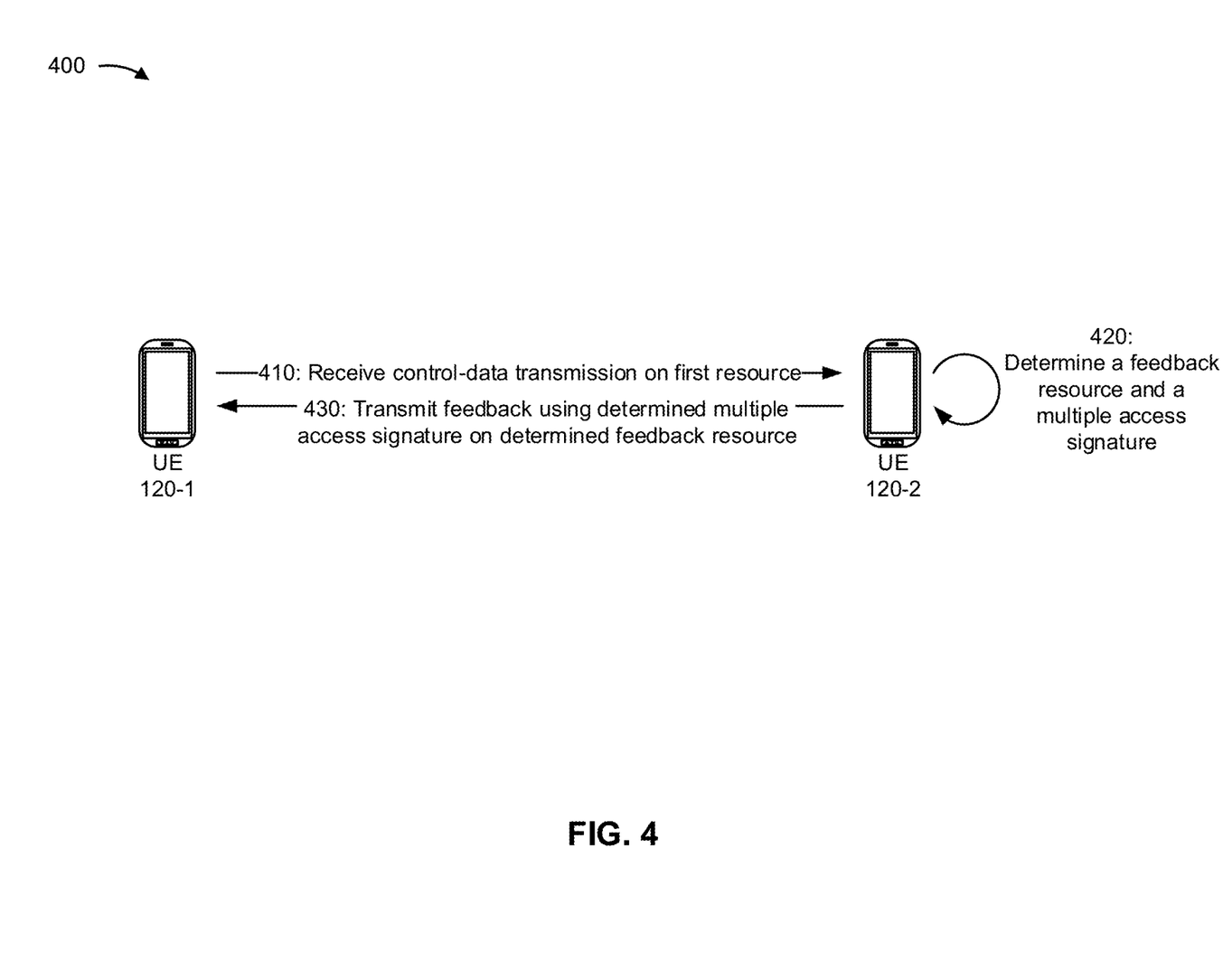
FIG. 4 is a diagram illustrating an example of feedback transmission using multiple access signatures, in accordance with various aspects of the present disclosure.

FIG. 4 is a diagram illustrating an example 400 of feedback transmission using multiple access signatures, in accordance with various aspects of the present disclosure. As shown in FIG. 4, example 400 includes a first UE 120-1 and a second UE 120-2.

As further shown in FIG. 4, and by reference number 410, second UE 120-2 may receive a control-data transmission on a first resource from first UE 120-1. For example, first UE 120-1 may transmit (e.g., using controller/processor 280, transmit the control-data transmission processor 264, TX MIMO processor 266, MOD 254, antenna 252, and/or the like) and second UE 120-2 may receive the control-data transmission (e.g., using antenna 252, DEMOD 254, MIMO detector 256, receive processor 258, controller/processor 280, and/or the like). In some aspects, first UE 120-1 may transmit a data transmission in a control-data resource (e.g., one or more slots of a channel) and may transmit control information in a portion of the control-data resource (e.g., a portion of one or more slots of the channel that is assigned for transmission of control information). In this case, as described above with regard to FIG. 3, first UE 120-1 may transmit data (e.g., UE-1 Data) in slot 1 and slot 2 of channel 1, and may transmit control information (e.g., c1) in slot 1 of channel 1.

As further shown in FIG. 4, and by reference number 420, second UE 120-2 may determine a second resource based at least in part on the first resource. For example, second UE 120-2 may determine the second resource using controller/processor 280 and/or the like. For example, second UE 120-2 may determine a feedback resource for a feedback transmission based at least in part on the control-data resource used to transmit data and/or control information. In this case, as described above with regard to FIG. 3, second UE 120-2 may determine that control information (e.g., c1) transmitted in slot 1 of channel 1 maps to feedback resource 1 in channel 1. Similarly, control information (e.g., c2) transmitted in slot 3 of channel 1 maps to feedback resource 1 in channel 1 (i.e., many-to-one mapping).

In some aspects, second UE 120-2 may determine the feedback resource based at least in part on a decode processing capability of first UE 120-1, second UE 120-2, and/or the like. For example, as described above with regard to FIG. 3, based at least in part on a determined delay in decoding a control-data transmission (e.g., UE-3 Data and c3), a feedback resource for the control-data transmission in slot 4 of channel 2 may be feedback resource 2 of channel 2, rather than feedback resource 1 of channel 1. In other words, a UE may be unable to decode a control-data transmission in a particular slot and transmit a feedback transmission in a feedback resource immediately after the particular slot. In such a case, the UE may map the control-data transmission in the particular slot to a subsequent feedback resource occurring a threshold period of time after the particular slot to enable decoding.

In some aspects, second UE 120-2 may select (e.g., using controller/processor 280) a multiple access signature for the feedback message to enable many-to-one mapping of control-data resources to feedback resources. For example, second UE 120-2 may determine a multiple access signature for the feedback message based at least in part on a slot where the control-data transmission from first UE 120-1 ends. In this way, second UE 120-2 enables a feedback message transmitted using a particular feedback resource for a particular control-data transmission to be differentiated from another feedback message transmitted using the same particular feedback resource but for a different control-data transmission.

In other words, as described above with regard to FIG. 3, UEs enable differentiation of a first feedback message using feedback resource 1 and triggered by transmission of data and control information in slots 1 and 2 of channel 1 from a second feedback message using feedback resource 1 and triggered by transmission of data and control information in slot 3 of channel 1. In this case, a first multiple access signature for the first feedback message is determined based at least in part on a slot index of slot 2 and a second multiple access signature for the second feedback message is determined based at least in part on a slot index of slot 3. In another example, UEs enable differentiation of control-data resources mapped to a sub-split of a feedback resource based at least in part on the multiple access signature that is determined.

In some aspects, second UE 120-2 may determine the multiple access signature based at least in part on a priority of the control-data transmission. For example, second UE 120-2 may select a particular multiple access signature to provide a higher QoS for feedback of a high priority control-data transmission relative to another feedback message from another UE for a low priority control-data transmission. In some aspects, the feedback transmission is a one-bit information message (e.g., an ACK message or NACK message). In this case, the multiple access signature may be determined based at least in part on a set of multiple access sequences which are cyclically shifted versions of a base sequence, and the cyclic shift may be based at least in part on the slot where the control-data transmission ended and the periodicity of the feedback resources.

As further shown in FIG. 4, and by reference number 430, second UE 120-2 may transmit, using the determined feedback resource, a feedback transmission. For example, second UE 120-2 may transmit the feedback transmission using controller/processor 280, transmit processor 264, TX MIMO processor 266, MOD 254, antenna 252, and/or the like. In some aspects, second UE 120-2 may transmit the feedback transmission using the selected multiple access signature to encode the feedback transmission (e.g., and to identify the control-data transmission that triggered the feedback transmission). In this way, second UE 120-2 enables many-to-one mapping of control-data resources to feedback resources by enabling differentiation of feedback transmissions based at least in part on corresponding triggering control-data transmissions.

In some aspects, second UE 120-2 may transmit a particular reference signal sequence using a particular subset of time-frequency resources within the feedback resources. For example, second UE 120-2 may determine the particular reference signal sequence and the particular subset of time-frequency resources based at least in part on the selected multiple access signature. In some aspects, second UE 120-2 may determine a sequence identifier, a time-division orthogonal cover code (TD-OCC) parameter, a frequency division orthogonal cover code (FD-OCC) parameter, a cyclic shift, and/or the like for the reference signal sequence transmission based at least in part on the selected multiple access signature. Additionally, or alternatively, second UE 120-2 may determine the sequence identifier (e.g., using controller/processor 280), the TD-OCC parameter, the FD-OCC parameter, the cyclic shift, and/or the like based at least in part on radio resource control (RRC) configuration signaling (e.g., which may be a part of a resource pool configuration). In this case, second UE 120-2 may use the reference signal sequence in connection with modulating the feedback information (e.g., and first UE 120-1 may use the reference signal sequence to demodulate the feedback information). In some aspects, second UE 120-2 may transmit the reference signal sequence on orthogonal resources to the feedback information being transmitted using the multiple access signature.

As indicated above, FIG. 4 is provided as an example. Other examples may differ from what is described with respect to FIG. 4.

Figure 5:
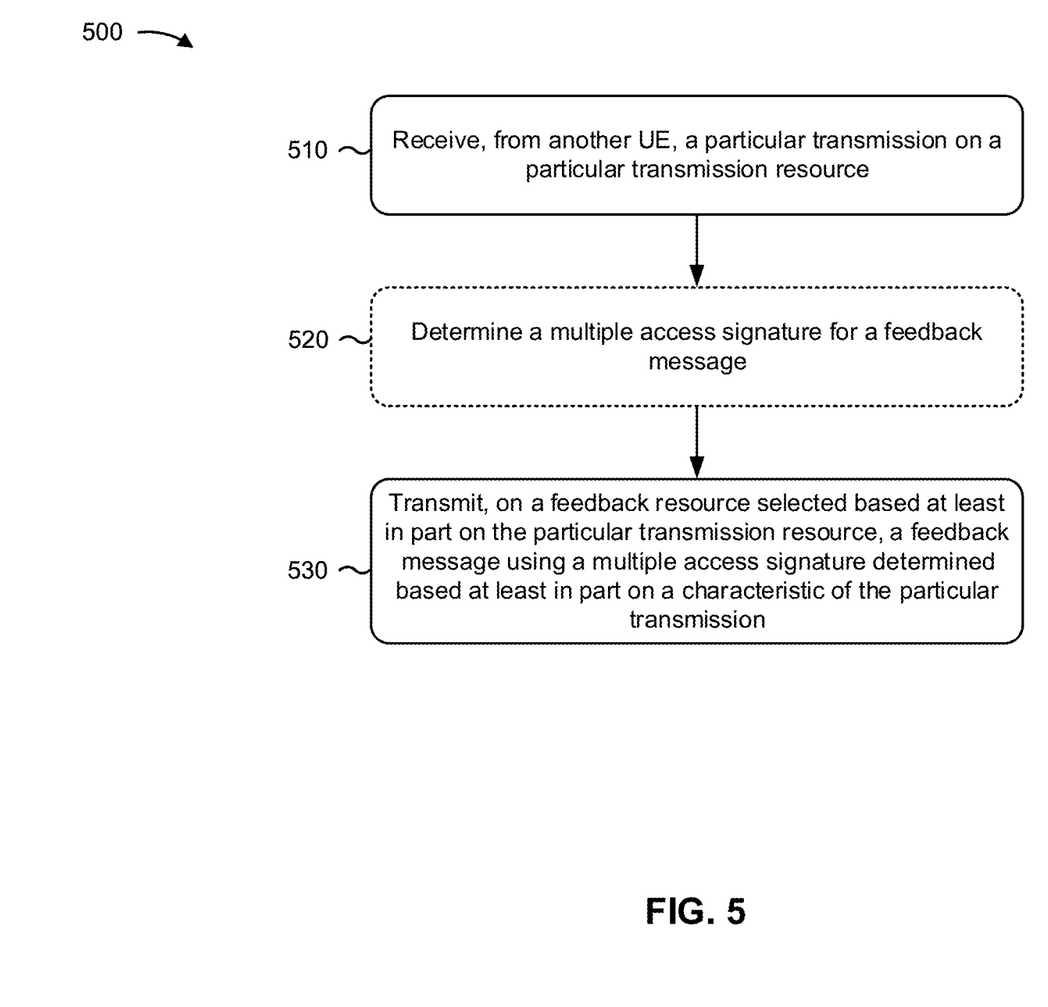
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120) performs feedback transmission using multiple access signatures.

As shown in FIG. 5, in some aspects, process 500 may include receiving, from another UE, a particular transmission on a particular transmission resource (block 510). For example, the UE (e.g., using antenna 252, DEMOD 254, MIMO detector 256, receive processor 258, controller/processor 280, and/or the like) may receive, from another UE, a particular transmission on a particular transmission resource, as described in more detail above.

As shown in FIG. 5, in some aspects, process 500 may include determining a multiple access signature for a feedback message (block 520). For example, the UE (e.g., using controller/processor 280 and/or the like) may determine a multiple access signature for a feedback message to enable the feedback message to be identified as corresponding to the particular transmission resource, as described in more detail above.

As shown in FIG. 5, in some aspects, process 500 may include transmitting, on a feedback resource selected based at least in part on the particular transmission resource, a feedback message using a multiple access signature determined based at least in part on a characteristic of the particular transmission (block 530). For example, the UE (e.g., using controller/processor 280, transmit processor 264, TX MIMO processor 266, MOD 254, antenna 252, and/or the like) may transmit, on a feedback resource selected based at least in part on the particular transmission resource, a feedback message using a multiple access signature determined based at least in part on a characteristic of the particular transmission, as described in more detail above.

Process 500 may include additional aspects, such as any single aspect and/or any combination of aspects described below and/or in connection with one or more other processes described elsewhere herein.

In a first aspect, the feedback resource is a system-wide periodic feedback resource. In a second aspect, alone or in combination with the first aspect, feedback may be transmitted using a multiple access signature in a sub-resource of a period or system-wide feedback resource. In a third aspect, alone or in combination with one or more of the first and second aspects, the feedback resource is associated with a many-to-one mapping from control-data resources to feedback resources. In a fourth aspect, alone or in combination with one or more of the first through third aspects, the particular transmission includes control information and payload data. In a fifth aspect, alone or in combination with one or more of the first through fourth aspects, the feedback resource is determined based at least in part on a decode processing capability of the UE. In a sixth aspect, alone or in combination with one or more of the first through fifth aspects, the multiple access signature is determined based at least in part on a slot in which the particular transmission ends and a feedback resource periodicity.

In a seventh aspect, alone or in combination with one or more of the first through sixth aspects, the multiple access signature is determined based at least in part on a resource pool configuration. In an eighth aspect, alone or in combination with one or more of the first through seventh aspects, the multiple access signature is determined based at least in part on a priority of the particular transmission. In a ninth aspect, alone or in combination with one or more of the first through eighth aspects, the multiple access signature is determined based at least in part on a quality of service parameter. In a tenth aspect, alone or in combination with one or more of the first through ninth aspects, a reference signal sequence and a set of time-frequency resources for a reference signal associated with the feedback message are determined based at least in part on the multiple access signature. In an eleventh aspect, alone or in combination with one or more of the first through tenth aspects, the UE is configured to determine, for the feedback message, at least one of: a sequence identifier, a time-division orthogonal cover code, a frequency-division orthogonal cover code, or a cyclic shift. In a twelfth aspect, alone or in combination with one or more of the first through eleventh aspects, information identifying at least one of candidate sequence identifiers, time-division orthogonal cover codes, frequency-division orthogonal cover codes, or cyclic shifts is received via radio resource control signaling of a resource pool configuration message.

In a thirteenth aspect, alone or in combination with one or more of the first through twelfth aspects, a reference signal is used to demodulate feedback information of the feedback message. In a fourteenth aspect, alone or in combination with one or more of the first through thirteenth aspects, the UE may transmit a reference signal for the feedback message using orthogonal resources concurrent with transmitting the feedback message using the multiple access signature. In a fifteenth aspect, alone or in combination with one or more of the first through fourteenth aspects, the feedback message is a one-bit information message.

In a sixteenth aspect, alone or in combination with one or more of the first through fifteenth aspects, the feedback message is an acknowledgement message or a negative-acknowledgement message. In a seventeenth aspect, alone or in combination with one or more of the first through sixteenth aspects, a set of possible multiple access sequences is a cyclically shifted version of a base sequence. In an eighteenth aspect, alone or in combination with one or more of the first through seventeenth aspects, the UE is configured to use, for the cyclically shifted version of the base sequence, a cyclic shift determined based at least in part on a slot in which the particular transmission ends and a feedback resource periodicity.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, by the UE and from another UE, a particular transmission on a particular transmission resource; and
   transmitting, from the UE to the other UE, and on a feedback resource selected based at least in part on the particular transmission resource, a feedback message using a multiple access signature that enables many-to-one mapping of control-data resources to feedback resources, wherein the multiple access signature is determined based at least in part on a characteristic of the particular transmission.

2. The method of claim 1, wherein the UE is configured to determine, for the feedback message, at least a cyclic shift, and wherein the multiple access signature is based on the cycle shift.

3. The method of claim 2, wherein information identifying at least one of candidate sequence identifier, time-division orthogonal cover code, frequency-division orthogonal cover code, or cyclic shift is received via radio resource control signaling of a resource pool configuration message.

4. The method of claim 1, wherein the feedback resource is a periodic feedback resource.

5. The method of claim 1, wherein the particular transmission includes control information and payload data.

6. The method of claim 1, wherein the feedback resource is determined based at least in part on a decode processing capability of the UE.

7. The method of claim 1, wherein the multiple access signature is determined based at least in part on a slot in which the particular transmission ends and a feedback resource periodicity.

8. The method of claim 1, wherein the multiple access signature is determined based at least in part on a resource pool configuration.

9. The method of claim 1, wherein the multiple access signature is determined based at least in part on a priority of the particular transmission.

10. The method of claim 1, wherein the multiple access signature is determined based at least in part on a quality of service parameter.

11. The method of claim 1, wherein a reference signal sequence and a set of time-frequency resources for a reference signal associated with the feedback message are determined based at least in part on the multiple access signature.

12. The method of claim 1, wherein a reference signal is used to demodulate feedback information of the feedback message.

13. The method of claim 1, further comprising:
   transmitting a reference signal for the feedback message using orthogonal resources concurrent with transmitting the feedback message using the multiple access signature.

14. The method of claim 1, where the feedback message is a one-bit information message.

15. The method of claim 1, where the feedback message is an acknowledgement message or a negative-acknowledgement message.

16. The method of claim 1, where a set of possible multiple access sequences is a cyclically shifted version of a base sequence.

17. The method of claim 16, wherein the UE is configured to use, for the cyclically shifted version of the base sequence, a cyclic shift determined based at least in part on a slot in which the particular transmission ends and a feedback resource periodicity.

18. A user equipment (UE) for wireless communication, comprising:
   a memory; and
   one or more processors operatively coupled to the memory, the one or more processors configured to:
      receive, by the UE and from another UE, a particular transmission on a particular transmission resource; and
      transmit, from the UE to the other UE, and on a feedback resource selected based at least in part on the particular transmission resource, a feedback message using a multiple access signature that enables many-to-one mapping of control-data resources to feedback resources, wherein the multiple access signature is determined based at least in part on a characteristic of the particular transmission.

19. The UE of claim 18, wherein the UE is configured to determine, for the feedback message, at least a cyclic shift, and wherein the multiple access signature is based on the cycle shift.

20. The UE of claim 19, wherein information identifying at least one of candidate sequence identifier, time-division orthogonal cover code, frequency-division orthogonal cover code, or cyclic shift is received via radio resource control signaling of a resource pool configuration message.

21. The UE of claim 18, wherein the feedback resource is a periodic feedback resource.

22. The UE of claim 18, wherein the particular transmission includes control information and payload data.

23. The UE of claim 18,
   wherein the multiple access signature is used to encode the feedback message and to identify the particular transmission, and
   wherein the particular transmission includes a control-data transmission that triggers the feedback message.

24. The UE of claim 18,
   wherein the particular transmission includes first control information,
   wherein the particular transmission resource includes a slot in a channel,
   wherein the first control information maps to the feedback resource in the channel, and
   wherein second control information, transmitted in a different slot in the channel, maps to the feedback resource in the channel.

25. A non-transitory computer-readable medium storing one or more instructions for wireless communication, the one or more instructions comprising:
   one or more instructions that, when executed by one or more processors of a user equipment (UE), cause the one or more processors to:
   receive, by the UE and from another UE, a particular transmission on a particular transmission resource; and
   transmit, from the UE to the other UE, and on a feedback resource selected based at least in part on the particular transmission resource, a feedback message using a multiple access signature that enables many-to-one mapping of control-data resources to feedback resources, wherein the multiple access signature is determined based at least in part on a characteristic of the particular transmission.

26. The non-transitory computer-readable medium of claim 25, wherein the UE is configured to determine, for the feedback message, at least a cyclic shift, and wherein the multiple access signature is based on the cycle shift.

27. The non-transitory computer-readable medium of claim 26, wherein information identifying at least one of candidate sequence identifier, time-division orthogonal cover code, frequency-division orthogonal cover code, or cyclic shift is received via radio resource control signaling of a resource pool configuration message.

28. A user equipment (UE) for wireless communication, comprising:
   means for receiving, by the UE and from another UE, a particular transmission on a particular transmission resource; and
   means for transmitting, from the UE to the other UE, and on a feedback resource selected based at least in part on the particular transmission resource, a feedback message using a multiple access signature that enables many-to-one mapping of control-data resources to feedback resources, wherein the multiple access signature is determined based at least in part on a characteristic of the particular transmission.

29. The UE of claim 28, wherein the UE is configured to determine, for the feedback message, at least a cyclic shift, and wherein the multiple access signature is based on the cycle shift.

30. The UE of claim 29, wherein information identifying at least one of candidate sequence identifier, time-division orthogonal cover code, frequency-division orthogonal cover code, or cyclic shift is received via radio resource control signaling of a resource pool configuration message.

* * * * *

UNITED STATES PATENT AND TRADEMARK OFFICE
CERTIFICATE OF CORRECTION

PATENT NO. : 11,265,134 B2
APPLICATION NO. : 16/737644
DATED : March 1, 2022
INVENTOR(S) : Kapil Gulati et al.

It is certified that error appears in the above-identified patent and that said Letters Patent is hereby corrected as shown below:

In the Claims

Claim 2:
Column 14, Line 18, change "the cycle shift" to --the cyclic shift--

Claim 19:
Column 15, Line 24, change "cycle shift" to --cyclic shift--

Claim 26:
Column 16, Line 19, change "based on the cycle shift" to --based on the cyclic shift--

Claim 29:
Column 16, Line 42, change "cycle shift" to --cyclic shift--

Signed and Sealed this
Twenty-seventh Day of December, 2022

Katherine Kelly Vidal
*Director of the United States Patent and Trademark Office*